United States Patent
Kim

(10) Patent No.: US 10,075,504 B2
(45) Date of Patent: Sep. 11, 2018

(54) METHOD AND APPARATUS FOR SHARING A FUNCTION WITH AN EXTERNAL DEVICE AND PERFORMING AN OPERATION

(75) Inventor: Dae-dong Kim, Gyeonggi-do (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 520 days.

(21) Appl. No.: 13/602,981

(22) Filed: Sep. 4, 2012

(65) Prior Publication Data
US 2013/0246611 A1    Sep. 19, 2013

(30) Foreign Application Priority Data
Mar. 14, 2012  (KR) .................. 10-2012-0026197

(51) Int. Cl.
*G06F 15/173* (2006.01)
*H04L 29/08* (2006.01)

(52) U.S. Cl.
CPC .............. *H04L 67/04* (2013.01); *H04L 67/10* (2013.01); *H04L 67/16* (2013.01)

(58) Field of Classification Search
CPC ......... H04L 67/04; H04L 67/10; H04L 67/16; H04L 67/303; H04L 67/28; H04L 65/1059; H04L 65/80; H04L 69/24; G06F 15/16; G06F 15/00; G06Q 99/00
See application file for complete search history.

(56) References Cited

U.S. PATENT DOCUMENTS

| | | | |
|---|---|---|---|
| 2004/0019683 A1* | 1/2004 | Lee ........................ | H04L 29/06 709/227 |
| 2006/0059003 A1* | 3/2006 | Requena ................. | H04L 67/16 709/224 |
| 2007/0072597 A1* | 3/2007 | Peuziat ............... | H04M 1/7253 455/418 |

(Continued)

FOREIGN PATENT DOCUMENTS

| | | |
|---|---|---|
| EP | 1239372 A1 | 9/2002 |
| EP | 1705576 A1 | 9/2006 |

(Continued)

OTHER PUBLICATIONS

European Office Action dated Mar. 24, 2017 in related European Patent Application No. 12182565.7 (6 pages).

(Continued)

*Primary Examiner* — Moustafa M Meky
*Assistant Examiner* — Kidest Mendaye
(74) *Attorney, Agent, or Firm* — Staas & Halsey LLP

(57) ABSTRACT

A method which performs an operation in a device on a network by sharing functions with at least one external device includes receiving, from a server, operation information defining an operation to be performed by executing a combination of at least one function of the device and at least one function of the at least one external device. The method may further include registering the operation defined by the operation information in the device and performing an operation selected from among one or more registered operations including the operation defined by the operation (Continued)

information. The operation may be performed by executing a combination of functions corresponding to the selected operation.

21 Claims, 12 Drawing Sheets

(56) References Cited

U.S. PATENT DOCUMENTS

| | | | | |
|---|---|---|---|---|
| 2007/0250458 | A1* | 10/2007 | Watanabe | G06Q 99/00 |
| | | | | 705/500 |
| 2009/0172780 | A1* | 7/2009 | Sukeda | H04N 7/17318 |
| | | | | 726/3 |
| 2010/0040212 | A1* | 2/2010 | Sakai | H04L 12/281 |
| | | | | 379/102.01 |
| 2011/0047214 | A1* | 2/2011 | Lee | H04L 12/2809 |
| | | | | 709/204 |
| 2012/0115549 | A1* | 5/2012 | Kim | H02J 7/0047 |
| | | | | 455/566 |
| 2013/0347028 | A1* | 12/2013 | Warrick | H04L 12/2809 |
| | | | | 725/30 |

FOREIGN PATENT DOCUMENTS

| | | |
|---|---|---|
| EP | 1768323 A1 | 3/2007 |
| KR | 10-2011-0020694 | 3/2011 |

OTHER PUBLICATIONS

Korean Office Action dated Oct. 23, 2017 in Korean Patent Application No. 10-2012-0026197.

* cited by examiner

FIG. 9

| OP. | Function | DESCRIPTION INFORMATION |
|---|---|---|
|  |  |  |
|  |  |  |
| 3 | Func.4→15→16 | CCTV USING SMART PHONE |
| 4 | Func.6→14→5 | PRINTING OF SCREEN SHOT USING PRINTER |
| 5 | Func.15→17→1 | ... |
| 6 | Func.14→19→15 | ... |
| 7 | Func.80→3→6 | ... |
|  |  |  |
|  |  |  |

METHOD AND APPARATUS FOR SHARING A FUNCTION WITH AN EXTERNAL DEVICE AND PERFORMING AN OPERATION

CROSS-REFERENCE TO RELATED APPLICATIONS

This application claims the benefit of Korean Patent Application No. 10-2012-0026197, filed on Mar. 14, 2012, in the Korean Intellectual Property Office, the disclosure of which is incorporated herein in its entirety by reference.

BACKGROUND

1. Field

The disclosure herein relates to a method and apparatus for sharing a function between a device and an external device and performing an operation.

2. Description of the Related Art

Electronic devices generally perform operations that are restricted and fixed to functions of software and hardware resources at the time when the electronic devices are launched. Such conventional electronic devices operate by using programs recorded therein at the time when the electronic devices are launched, and thus they cannot accommodate new functions after the products are launched. Research has recently been conducted into a method of indirectly extending functions of electronic devices by sharing resources between various electronic devices.

SUMMARY

Additional aspects and/or advantages will be set forth in part in the description which follows and, in part, will be apparent from the description, or may be learned by practice of the invention.

The present invention provides a method and apparatus for registering an operation in a device and performing the operation by sharing a function with an external device and performing the registered operation with the external device.

The present invention also provides a method and apparatus for providing a device with operation information defining an operation, where the operation may be performed by sharing a function with an external device.

According to an aspect of the present invention, there is provided a method of performing an operation in a device on a network by sharing functions with at least one external device, the method including: receiving operation information defining an operation performed by executing a combination of at least one function of the device and at least one function of the at least one external device; registering the operation defined by the operation information in the device; and performing a selected operation from among one or more registered operations including the operation defined by the operation information, by executing a combination of functions corresponding to the selected operation.

According to another aspect of the present invention, there is provided a non-transitory computer readable recording medium having recorded thereon a computer program for executing the above method.

According to another aspect of the present invention, there is provided a method of providing operation information defining an operation to be performed by sharing functions between a plurality of devices on a network, the method including: determining whether an operation defined by combining functions of at least two of the plurality of devices is included in an operation definition file; retrieving operation information corresponding to the operation from the operation definition file according to a result of the determining; and transmitting the retrieved operation information.

According to another aspect of the present invention, there is provided a non-transitory computer readable recording medium having recorded thereon a computer program for executing the above methods.

According to another aspect of the present invention, there is provided a device for performing an operation by sharing functions with at least one external device on a network, the device including: a network interface for receiving operation information defining an operation performed by executing a combination of at least one function of the device and at least one function of the at least one external device; an operation registering unit for registering the operation defined by the operation information in the device; and an operation performing unit for performing an operation selected from among one or more registered operations including the operation defined by the operation information, by executing a combination of functions corresponding to the selected operation.

The device may further include a storage unit to store function information regarding functions of the device, function information regarding functions of external devices on the network, and operation information regarding operations registered in the device. The function information may include a function identifier, a function class, a type of input data, and a type of output data.

According to another aspect of the present invention, there is provided a server for providing operation information defining an operation to be performed by sharing functions between a plurality of devices on a network, the server including: a determining unit for determining whether an operation defined by combining functions of at least two of the plurality of devices is included in an operation definition file defining; a retrieving unit for retrieving operation information corresponding to the operation from the operation definition file according to a result of the determining; and a network interface for transmitting the retrieved operation information.

The server may further include a storage unit to store the operation definition file, function information of devices on the network, and operation information regarding operations registered in devices on the network.

BRIEF DESCRIPTION OF THE DRAWINGS

The above and other features and advantages of the present invention will become more apparent by describing in detail exemplary embodiments thereof with reference to the attached drawings in which:

FIG. 9 is a schematic table of operation information of an operation definition file, according to an embodiment of the present invention.

DETAILED DESCRIPTION

Figure 1:
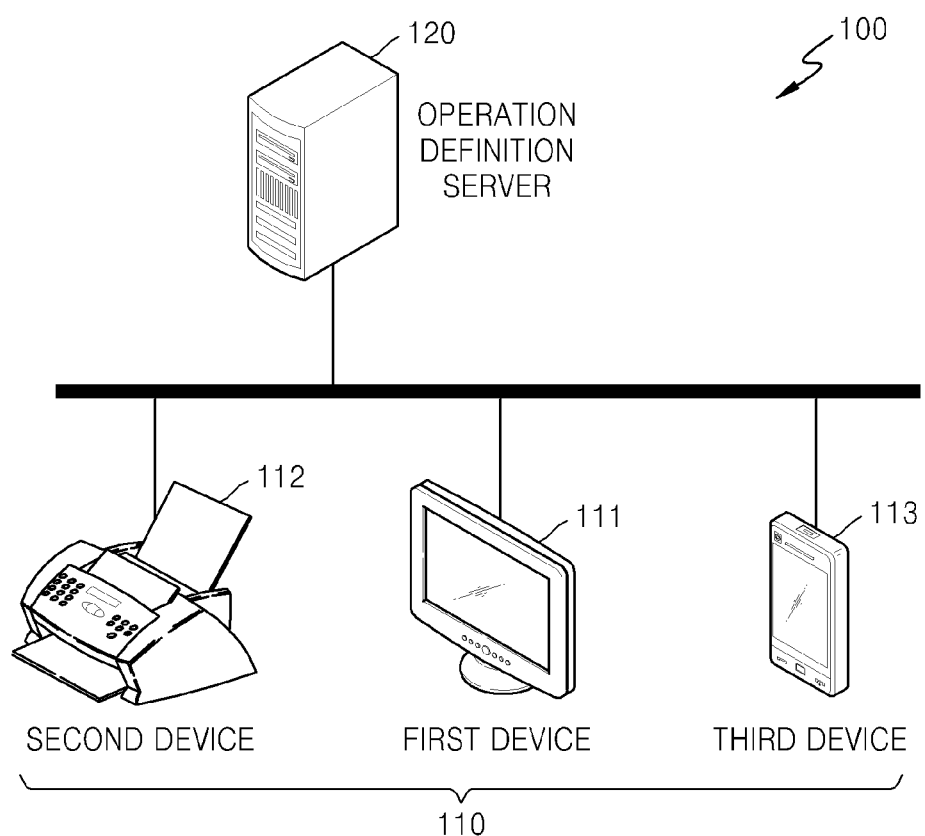
FIG. 1 is a diagram illustrating a system that shares functions of devices and performs operations, according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. Expressions such as "at least one of," when preceding a list of elements, modify the entire list of elements and do not modify the individual elements of the list.

A job performed by a device according to the present invention may include a function and an operation. The terms function and operation will now be described with reference to an example. The device according to the present invention includes at least one function. In this regard, the function corresponds to an execution of at least one hardware resource included in the device. For example, a television (TV) includes hardware resources such as a tuner, a decoder and processor, an image signal output unit, a sound signal output unit, a display unit, a speaker, and the like. The TV includes functions such as a broadcast signal receiving function corresponding to the tuner, an image and sound signal decoding function corresponding to the decoder and processor, an image signal processing and outputting function corresponding to the image signal output unit, a sound signal processing and outputting function corresponding to the sound signal output unit, a display function corresponding to the display unit, and the like.

A device performs one or more predetermined operations which are selected by a user from among one or more operations registered therein. In this regard, an operation may refer to a series of processes that perform at least one of the above-described functions. Registering an operation in a device occurs in a status in which information defining the operation is stored in the device, and the device is able to perform the operation according to the stored information. One operation may include a plurality of functions. If the user selects one operation including a plurality of functions, each function included in the selected operation is executed according to information defining the selected operation. Information defining an operation registered at the time when a manufacturer launches a product may be stored in a device. For example, a broadcasting watching operation among operations of the TV may include sequentially executing the broadcast signal receiving function, the image and sound signal decoding function, the image and sound signal processing and outputting functions, and an image and sound reproducing function. Examples of other operations of the TV may include a channel changing operation, a volume changing operation, a recording operation, and the like.

Hereinafter, exemplary embodiments of the present invention will be described in greater detail with reference to the accompanying drawings.

FIG. 1 is a diagram illustrating a system 100 that shares functions of devices and performs operations, according to an embodiment of the present invention.

Referring to FIG. 1, the system 100 includes devices 110 and an operation definition server 120.

The devices 110 include a first device 111, a second device 112, and a third device 113. The devices 110 include respective network interfaces for connection to a network. The devices 110 are present on the same network. The network may include, for example a wired or wireless network, such as ETHERNET, WIFI, ZIGBEE, BLUETOOTH, RS232, RS 422, or RS485, for example.

By way of example, the first device 111 may be a TV, the second device 112 a printer, and the third device 113 a smart phone. The TV 111 will be described for convenience of description. However, the devices 110 may include other types of electronic devices which may operate on a network, including lighting devices, heating, ventilation, and air conditioning (HVAC) devices, water supply devices, sanitary devices, cameras, personal computers, appliances, sound systems, home theater systems, settop boxes, digital versatile disc (DVD) players, and other consumer electronic products, for example.

The system 100 will now be described according to an embodiment as follows.

The TV 111 detects the printer 112 and the smart phone 113 over the network. The TV 111 obtains function information regarding at least one function of each of the detected printer 112 and smart phone 113. For example, it is assumed that the TV 111 obtains function information regarding a printing function of the printer 112 and a camera function of the smart phone 113. Although the TV 111 obtains the function information regarding the functions of the printer 112 and smart phone 113, operations for using the functions of the printer 112 and smart phone 113 are not registered in the TV 111. If the operation for using the obtained function of the printer 112 or the smart phone 113 is registered in the TV 111, the TV 111 may perform the operation by sharing the function of the printer 112 or the smart phone 113. Thus, the TV 111 may be deemed to be optimized for an environment in which it is installed.

The TV 111 requests operation information regarding the operation using the functions of the printer 112 and smart phone 113 from the operation definition server 120. That is, the TV 111 requests the operation information regarding the operation from the operation definition server 120 in order to register the operation for using the printing function of the printer 112 and the camera function of the smart phone 113 therein. The TV 111 may transmit the function information regarding the functions of the printer 112 and the smart phone 113 to the operation definition server 120 while requesting the operation information regarding the operation.

The operation definition server 120 stores information regarding a plurality of operations previously input by a manufacturer therein. The operations stored in the operation definition server 120 are not limited to the operations of the TV 111, the printer 112, and the smart phone 113. For example, the operation definition server 120 may store information regarding operations of other types of devices, such as a settop box, a home theater, an air conditioner, a refrigerator, appliances, and/or other electronic devices. The information regarding the operations stored in the operation definition server 120 includes information about operations performed by sharing functions of a plurality of devices. The operation definition server 120 provides the TV 111 with the operation information in response to the request from the TV 111. The operation definition server 120 provides the TV 111 with the operation information regarding operations that can be performed by the TV 111 based on the functions of the devices 110. The operation definition server 120 may provide the TV 111 with an operation in combination with the functions of the TV 111 and the printer 112. For example, the operation definition server 120 may provide the TV 111 with an operation of "printing a screen shot using the printer 112". The operation definition server 120 may also provide the TV 111 with an operation in combination with the functions of the TV 111 and the smart phone 113. For example, the operation definition server 120 may provide the TV 111 with an operation of "a closed-circuit television (CCTV) using the smart phone 113".

The TV 111 registers a new operation within itself according to the operation information received from the operation definition server 120. The TV 111 performs the new operation in connection with the printer 112 or the smart phone 113. The user selects the operation of printing the screen shot of the TV 111 while watching the TV 111, thereby printing a frame of a specific broadcasting signal through the printer 112. The user performs the "operation of the CCTV using the smart phone 113" by using a camera of the smart phone 113 as the CCTV, and sees an image captured by the smart phone 113 through the TV 111 in real time.

Likewise, new operations may be registered in the printer 112 and the smart phone 113. Thus, predetermined operations performed by organically sharing resources between the devices 110 are registered in the devices 110. Accordingly, the user may avoid inconvenient tasks requiring individually and manually registering operations of the devices 110. Also, even a user who does not have enough knowledge to register operations is able to register operations of the devices 110 through the operation definition server 120. The devices 110 can perform not only newly registered operations but also perform routine operations. In addition, the devices 110 may be necessarily optimized for an environment in which the devices 110 are installed by registering operations thereof. These examples are only for convenience of description and the present invention is not limited thereto.

Now, the system 100 will be described according to another embodiment.

According to the former embodiment, the TV 111 may detect the printer 112 and the smart phone 113, and obtain information regarding the functions of the printer 112 and the smart phone 113. However, according to another embodiment described in more detail below, the operation definition server 120 may detect the devices 110, and obtain information regarding functions of the devices 110.

The operation definition server 120 detects the devices 110. The operation definition server 120 obtains function information regarding the functions of the detected devices 110. For example, the operation definition server 120 broadcasts a message requesting the function information regarding the functions to the devices 110, thereby obtaining the function information regarding the functions of the detected devices 110. The operation definition server 120 determines whether operation information regarding operations that can be performed by the TV 111 by sharing the function of the printer 112 and the smart phone 113 is stored therein based on the obtained function information. For example, the operation definition server 120 determines that the "operation of printing the screen shot of the printer 112" and the "operation of the CCTV using the smart phone 113" are stored therein as the operations that can be performed by the TV 111. The operation definition server 120 transmits the operation information defining the "operation of printing the screen shot of the printer 112" and the "operation of the CCTV using the smart phone 113" to the devices 110. The operation definition server 120 may transmit the operation information defining the above operations only to the TV 111.

The TV 111 registers the "operation of printing the screen shot of the printer 112" and the "operation of the CCTV using the smart phone 113" therein based on the operation information received from the operation definition server 120. A detailed description regarding how to perform the registered operations in the TV 111 will be described later.

Figure 2A:
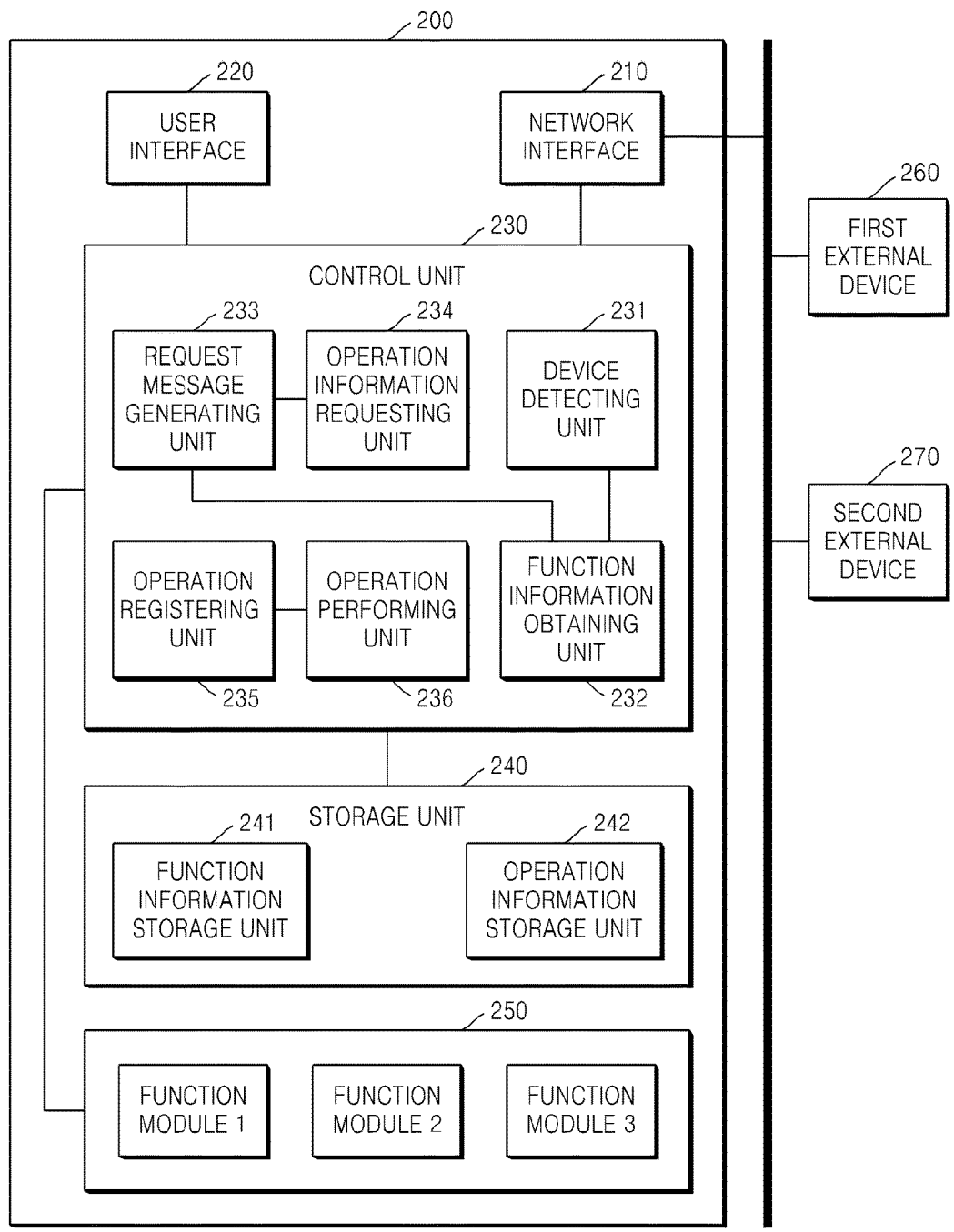
FIG. 2A is a block diagram illustrating a device, according to an embodiment of the present invention.

FIG. 2A is a block diagram illustrating a device 200, according to an embodiment of the present invention.

Referring to FIG. 2A, the device 200 includes a network interface 210, a user interface 220, a control unit 230, a storage unit 240, and function modules 250.

The network interface 210 is used to allow the device 200 to be connected to a predetermined network over a wired or wireless communication interface. The network interface 210 may be configured as a standardized wired or wireless communication interface.

The user interface 220 provides a user with an input/output interface used to manipulate the device 200. The user interface may include a graphical user interface or a touch screen, for example, but the present invention is not limited to these types of user interfaces. The user interface 220 may receive a predetermined request regarding the manipulation of the device 200 from the user. For example, the user interface 220 may receive a request for performing or registering a predetermined operation from the user.

The storage unit 240 includes a function information storage unit 241 and an operation information storage unit 242.

The function information storage unit 241 stores function information regarding functions of the device 200. In this regard, the function information may include a function identifier, a function class, a type of input data, and a type of output data, thereby a predetermined function is defined. The function identifier may use, for example, a universally unique identifier (UUID) as information allocated to identify the function. The function class is a classification system that groups similar functions. Functions that belong to the same class are compatible with each other. Therefore, different devices may share functions that belong to the same class based on a network, thereby sharing resources thereof. For example, classes may be classified into image output, sound output, wireless communication, standard input, standard output, low speed wired communication, high speed wired communication, and the like. The type of the input data is information indicating a format of the input data. For example, in a case where bit strings of the input data include a plurality of different pieces of data, sizes and arrangement of the data may be determined through the type of the input data. The type of the output data is information indicating a format of the output data, which corresponds to the type of the input data.

The function information of the device 200 may be stored in the function information storage unit 241 by a manufacturer, for example, or another entity or user, which may be authorized to do so. The function information storage unit 241 may also store function information regarding functions of first and second external devices 260, 270 that are present on the same network as that of the device 200. While FIG. 2A illustrates two external devices, the present invention is not limited thereto. For example, there may be more than two external devices or less than two external devices present on the network, and two external devices are shown merely for the sake of convenience in describing the present invention. A method of obtaining the function information of the first and second external devices 260, 270 will be described later.

The function information storage unit 241 may separately store the function information of the device 200 and the function information of the first and second external devices 260, 270. In a case where the function information of the first and second external devices 260, 270 is stored in the function information storage unit 241, information regarding identifiers of the first and second external devices 260, 270 may also be stored in the function information storage unit 241. The identifiers of the first and second external devices 260, 270 may use, for example, a medium access control (MAC) address, as intrinsic information allocated for each of the first and second external devices 260, 270.

The user may set the functions of the device 200 as sharable functions and non-sharable functions by using the user interface 220. A sharable function is referred to as a function that can be performed according to a request of the first and second external devices 260, 270. That is, sharable functions of the device 200 may be provided to an external device in order to perform an operation of the external device. On the other hand, a non-sharable function is referred to as a function that cannot be performed in connection with the first and second external devices 260, 270. In other words, the device 200 may not keep non-sharable functions open to the first and second external devices 260, 270.

The operation information storage unit 242 stores operation information regarding operations registered in the device 200. That is, the device 200 may perform a predetermined operation requested by the user by using the operation information stored in the operation information storage unit 242. The operation information may include information regarding a sequence of functions included in the operations to be performed and times at which the functions start and end being performed. Since there may be a plurality of operations that can be performed by the device 200, the operation information storage unit 242 also stores operation identifiers to identify the operations. Moreover, it is possible that a device may perform two or more operations simultaneously.

The function modules 250 are hardware resources corresponding to the functions of the device 200. The functions of the device 200 are performed by driving the function modules 250.

The control unit 230 includes a device detecting unit 231, a function information obtaining unit 232, a request message generating unit 233, an operation information requesting unit 234, an operation registering unit 235, and an operation performing unit 236.

The device detecting unit 231 detects the first and second external devices 260, 270 that are present on a network through the network interface 210. For example, if the device 200 is connected to the network, the device detecting unit 231 broadcasts a detection message used to detect the first and second external devices 260, 270 to the network. The connection of the device 200 to the network may be notified to the first and second external devices 260, 270 by broadcasting the detection message. The device detection unit 231 may detect the first and second external devices 260, 270 by receiving a response to the detection message from the first and second external devices 260, 270. The device detection unit 231 may use a standardized device detection method such as universal plug and play (UPnP), etc.

The function information obtaining unit 232 obtains function information regarding functions of the detected first and second external devices 260, 270. The function information obtaining unit 232 transmits a function information request message used to request the function information from the first and second external devices 260, 270 through the network interface 210. The function information obtaining unit 232 receives a function information message in response to the function information request message. The function information message includes information regarding sharable functions of the first and second external devices 260, 270. The function information message may include information regarding a function identifier, a function class, a type of input data, and a type of output data.

The request message generating unit 233 generates an operation information request message based on a result of the detection of at least one of the first and second external devices 260, 270. The operation information request message is a message used to request operation information necessary for registering operations in the device 200 from an operation definition server. The information included in the operation information request message is determined according to the functions of the first and second external devices 260, 270. The operation information request message may include a list of functions of the first and second external devices 260, 270 and device 200. The request message generating unit 233 generates the operation information request message based on the function information stored in the function information storage unit 241.

The operation information requesting unit 234 transmits the operation information request message to the operation definition server through the network interface 210.

The operation registering unit 235 registers one or more operations of the device 200 based on a response message of the operation definition server in response to the operation information request message. The operation definition server retrieves operation information corresponding to the operation information request message from an operation definition file input by a manufacturer, for example, or another entity or user, which may be authorized to input information to the operation definition server. The response message of the operation definition server includes the operation information retrieved from the operation definition file. The operation that is registered in the device 200 by the operation registering unit 235 includes the functions of the first and second external devices 260, 270. The operation information includes information regarding an operation in combination with at least one function included in the device 200 and at least one function included in the first and second external devices 260, 270. Therefore, the operation performing unit 236 performs the operation registered by the operation registering unit 235 in connection with the first and second external devices 260, 270.

The response message of the operation definition server may include description information regarding operations. The description information may refer to information used to describe the operation included in the response message to the user. For example, the description information may include a list of operations to be registered, a list of external devices requiring connections to perform operations, methods of performing operations, examples of operations to be performed, and the like. The operation registering unit 235 provides the user with the description information included in the response message through the user interface 220. The user determines one or more operations that can be registered in the device 200 based on the description information. The user may select one or more operations whose registration is desired through the user interface 220. The operation registering unit 235 registers the one or more operations selected by the user in the device 200. That is, the operation registering unit 235 stores the operations selected by the user in the operation storage unit 242. However, according to a modification of an embodiment, the user may skip selecting the operation and the operation registering unit 235 may instead register all of the operation information regarding operations included in the response message. In other embodiments, a default setting or predetermined setting of the device 200 may be set beforehand such that the operation registering unit 235 registers all or some of the operation information regarding operations included in the response message, according to the default or predetermined setting of the device 200.

The operation performing unit 236 performs the operation requested by the user. The operation performing unit 236 performs the operation based on the operation information stored in the operation information storage unit 242. In a case where the operation performing unit 236 performs an operation requiring a connection to an external device, the operation performing unit 236 may perform an authentication process for obtaining a right to perform a function of the external device.

In performing a predetermined function included in the operation selected by the user, the operation performing unit 236 may call other functions having the same function class value as that of the predetermined function included in the selected operation based on the function information storage unit 241. In other words, the operation performing unit 236 may determine the other functions compatible with the predetermined function included in the selected operation through the function information storage unit 241. In this regard, other functions may be the functions of the first and second external devices 260, 270. The operation performing unit 236 may replace the predetermined function included in the selected operation with other functions having the same function class value to constitute operations. For example, a function A of the device 200 and a function B of an external device may belong to a class "display". The device 200 shares the function B with the external device instead of the function A necessary for performing the predetermined operation, thereby performing the operation selected by the user. The operation performing unit 236 determines functions included in the operation selected by the user from among the operations registered in the device 200, and replaces the determined functions with other functions that belong to the same function class, thereby constituting new operations. The operation performing unit 236 performs one of a plurality of operations including the new operations according to a user's selection.

Figure 2B:
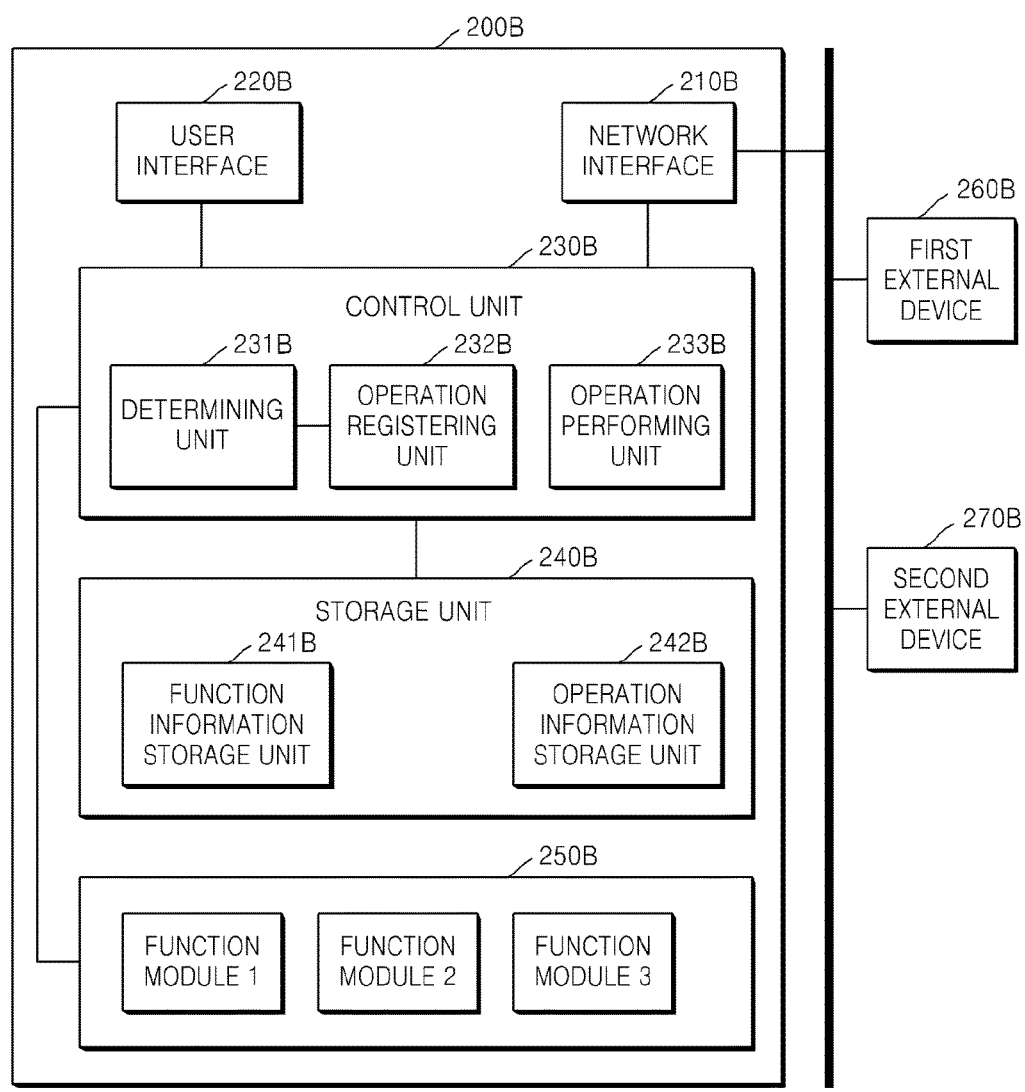
FIG. 2B is a block diagram illustrating a device, according to another embodiment of the present invention.

FIG. 2B is a block diagram illustrating a device 200B, according to another embodiment of the present invention.

Referring to FIG. 2B, the device 200B includes a network interface 210B, a user interface 220B, a control unit 230B, a storage unit 240B, and function modules 250B.

The elements of the device 200B except the control unit 230A are the same as described with reference to FIG. 2A, and thus redundant descriptions are omitted here. However, one of ordinary skill in the art would understand that although device 200A and device 200B are shown to have different elements, a device may include all of the elements shown in FIGS. 2A and 2B, and the respective elements are merely separately illustrated for the sake of convenience in explaining the present invention.

The control unit 230B includes a determining unit 231B, an operation registering unit 232B, and an operation performing unit 233B.

The determining unit 231B determines whether a function of the device 200B is included in a combination of functions corresponding to an operation defined by operation information received from an operation definition server. That is, the determining unit 231B compares the function of the device 200B stored in a function information storage unit 241B with the operation information received through the network interface 210B. Thus, the determining unit 231B determines whether the operation defined by the received operation information includes the function of the device 200B.

If the operation registering unit 232B determines that the operation defined by the operation information includes the function of the device 200B, the operation registering unit 232B registers the defined operation in the device 200B. The operation registering unit 232B stores the registered operation in an operation information storage unit 242B. An operation of the operation registering unit 232B that registers the operation in the device 200B includes functions of first and second external devices 260B, 270B.

An operation performing unit 233B is described with reference to FIG. 2A and will be described with reference to FIGS. 6 through 8.

Figure 3A:
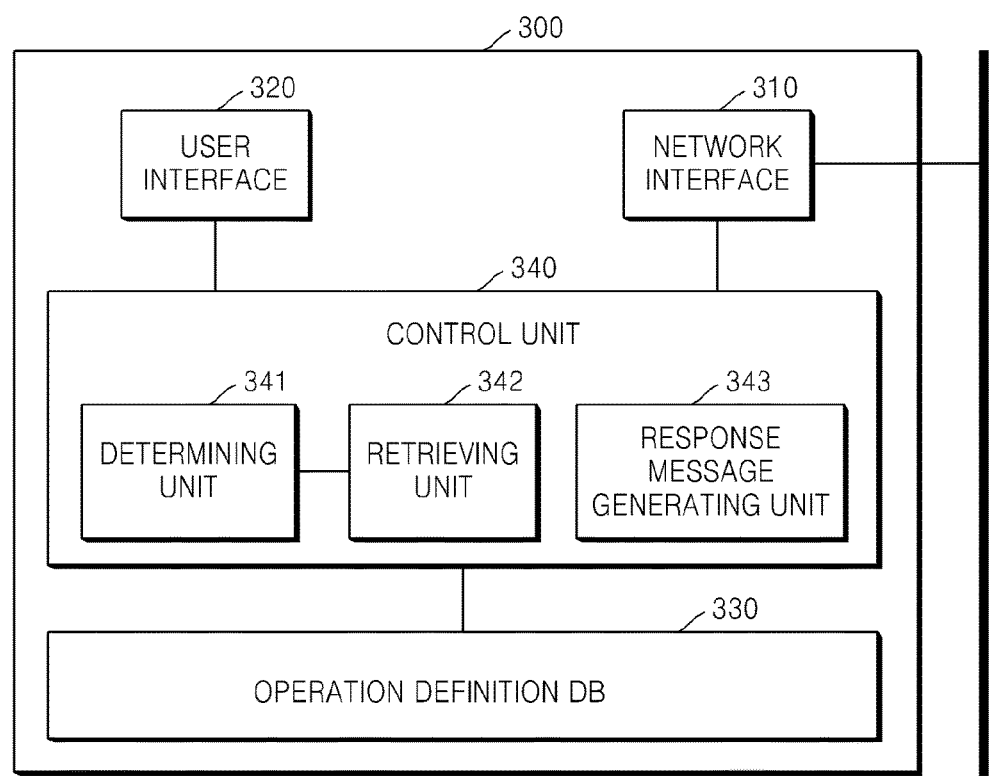
FIG. 3A is a block diagram illustrating an operation definition server, according to an embodiment of the present invention.

FIG. 3A is a block diagram illustrating an operation definition server 300, according to an embodiment of the present invention.

Referring to FIG. 3A, the operation definition server 300 includes a network interface 310, a user interface 320, an operation definition database (DB) 330, and a control unit 340.

The network interface 310 is used to allow the operation definition server 300 to be connected to a network over a wired or wireless communication interface. The network interface 310 may be configured as a standardized wired or wireless communication interface. The network interface 310 receives an operation information request message transmitted by the device 200. The network interface 310 also transmits a response message to the operation information request message to the device 200. A description of the operation information request message is described with reference to FIG. 2A.

The user interface 320 includes an input unit and an output unit used to manipulate the operation definition server 300. The operation definition DB 330 stores an operation definition file therein. The operation definition file includes operation information regarding an operation that can be performed by a predetermined device. The operation definition file includes operation information regarding an operation performed by a single device. The operation definition file also includes operation information regarding operations that can be performed in connection with a plurality of devices. Thus, operations stored in the operation definition file may include an operation in combination with functions of the plurality of devices. A device manufacturer may manufacture and manage the operation definition file. However, other entities or users may manage the operation definition file, if desired. For example, if a new device is launched, the device manufacturer updates the operation definition file in consideration of a function of the new device. However, other entities or users may update the operation definition file, if desired. The operation definition file may further include the explanation or description information regarding operations described with reference to FIGS. 2A and 2B.

The control unit 340 includes a determining unit 341, a retrieving unit 342, and a response message generating unit 343. The determining unit 341 determines whether the operation definition file includes operation information corresponding to the operation information request message received through the network interface 310. The determining unit 341 compares functions included in the operations of the operation definition file with a list of functions included in the operation information request message. If the list of functions included in the operation information request message includes all functions included in one of the operations of the operation definition file, the determining unit 341 determines one of the operations of the operation definition file as the operation corresponding to the operation information request message.

The retrieving unit 342 retrieves the operation information corresponding to the operation information request message from the operation definition file based on a result of the determination by the determining unit 341. The retrieving unit 342 retrieves information regarding a combination of functions of the device 200 and an external device as the operation information. The retrieving unit 342 may retrieves description information regarding operations.

The response message generating unit 343 generates the response message to the operation information request message. The response message includes the information retrieved by the retrieving unit 342. The response message is transmitted to the device 200 through the network interface 310.

Figure 3B:
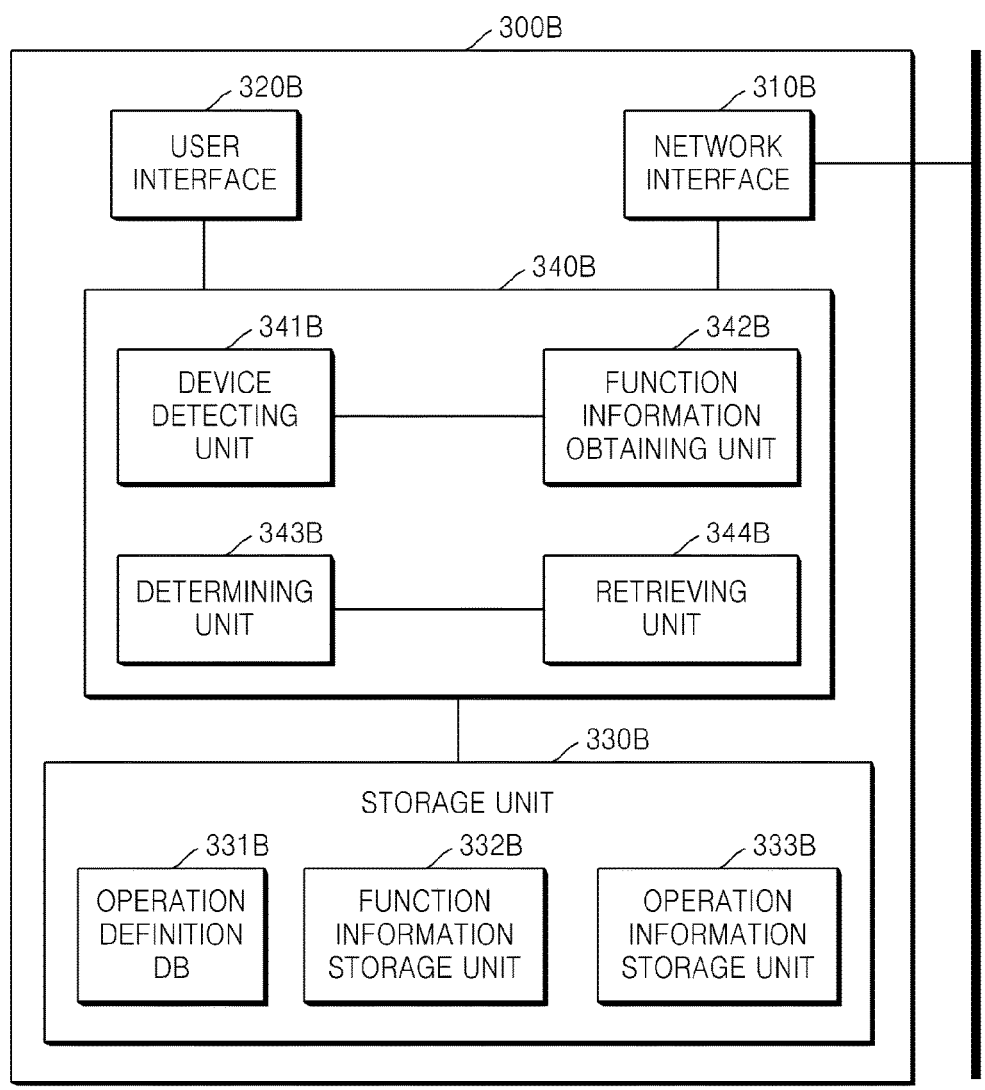
FIG. 3B is a block diagram illustrating an operation definition server, according to another embodiment of the present invention.

FIG. 3B is a block diagram illustrating an operation definition server 300B, according to another embodiment of the present invention.

Referring to FIG. 3B, the operation definition server 300B includes a network interface 310B, a user interface 320B, a storage unit 330B, and a control unit 340B. Redundant descriptions between the operation definition server 300B and the operation definition server 300 of FIG. 3A are omitted here. However, one of ordinary skill in the art would understand that although operation definition servers 300A and 300B are shown to have different elements, an operation definition server may include all of the elements shown in FIGS. 3A and 3B, and the respective elements are merely separately illustrated for the sake of convenience in explaining the present invention.

The storage unit 330B includes an operation definition DB 331B, a function information storage unit 332B, and an operation information storage unit 333B.

The function information storage unit 332B stores function information regarding functions of devices that are present on a network. For example, the function information storage unit 332B may store a device identifier and a function identifier of each of the devices that are present on the network by linking the device identifier and the function identifier. The operation definition server 300B may figure out a function of a predetermined device on the network based on the function information storage unit 332B.

The operation information storage unit 333B stores information defining operations registered in the devices that are present on the network. That is, information regarding operations that can be currently performed by the devices is stored in the operation information storage unit 333B. If a predetermined device registers the new operation therein, the operation information storage unit 333B stores information defining the newly registered operation therein. Accordingly, the operation information storage unit 333B may transmit the information defining the operations to a device except information regarding an operation previously registered in the device. Alternatively, the operation definition server 300B may not include the operation information storage unit 333B but may instead transmit all of the information read from the operation definition file to the device.

The control unit 340B includes a device detecting unit 341B, a function information obtaining unit 342B, a determining unit 343B, and a retrieving unit 344B.

The device detecting unit 341B detects one or more devices that are present on a network through the network interface 310B. The device detecting unit 341B may periodically broadcast a message to the network in order to detect the plurality of devices that are present on the network. The message may be broadcast automatically on a predetermined schedule according to a user input or default setting, or may manually broadcast according to a user input. According to another embodiment, the device detecting unit 341B receives a message used to inform other devices of a connection of a device newly installed on the network, thereby detecting the newly installed device. For example, if the device 200B is connected to the network, the device 200B broadcasts a message notifying a connection to the network, and the device detecting unit 341B receives the message, thereby detecting the device 200B. The device detecting unit 341B may identify the newly installed device from among the plurality of devices by using the function information storage unit 332B or the operation information storage unit 333B. The device detecting unit 341B may use a standardized detection method such as UPnP.

The function information obtaining unit 342B obtains function information regarding functions of the devices that are present on the network through the network interface 342B. The function information obtaining unit 342B obtains function information regarding functions of the devices detected by the device detecting unit 341B. The function information obtaining unit 342B stores the obtained function information by linking the obtained function information with device identifiers. The function information obtaining unit 342B transmits a function information request message that requests the function information to the detected devices through the network interface 310B. The function information obtaining unit 342B receives a function information message in response to the function information request message. The function information message includes information regarding sharable functions of external devices. The function information message may include information of a device identifier, a function class, a type of input data, and a type of output data.

The determining unit 343B determines whether an operation defined by combining functions of at least two of the devices present on the network is included in the operation definition file. The determining unit 343B may determine whether an operation corresponding to a combination of functions of the newly installed device detected by the device detecting unit 341A and the detected devices is included in the operation definition file. If the operation defined by combining functions of at least two of the devices present on the network is included in the operation definition file, the determining unit 343B may determine whether the operation is previously registered in a corresponding device by using the operation information storage unit 333B. If the determining unit 343B determines that the operation definition file does not include an operation other than the operation previously registered in the corresponding device, the operation definition server 300B may not transmit operation information to the corresponding device.

The retrieving unit 344B retrieves the operation information defining the operation from the operation definition file based on a result of the determination by the determining unit 343B. The retrieving unit 344B may retrieve description information regarding the operation.

The operation definition server 300B transmits the retrieved operation information to the devices present on the network. The operation definition server 300B may broadcast the operation information regarding the operation to the devices present on the network. According to another example, the operation definition server 300B may specify a device capable of performing the operation and transmit the operation information to the specified device. The operation information may be transmitted via the network interface 310B.

Figure 4A:
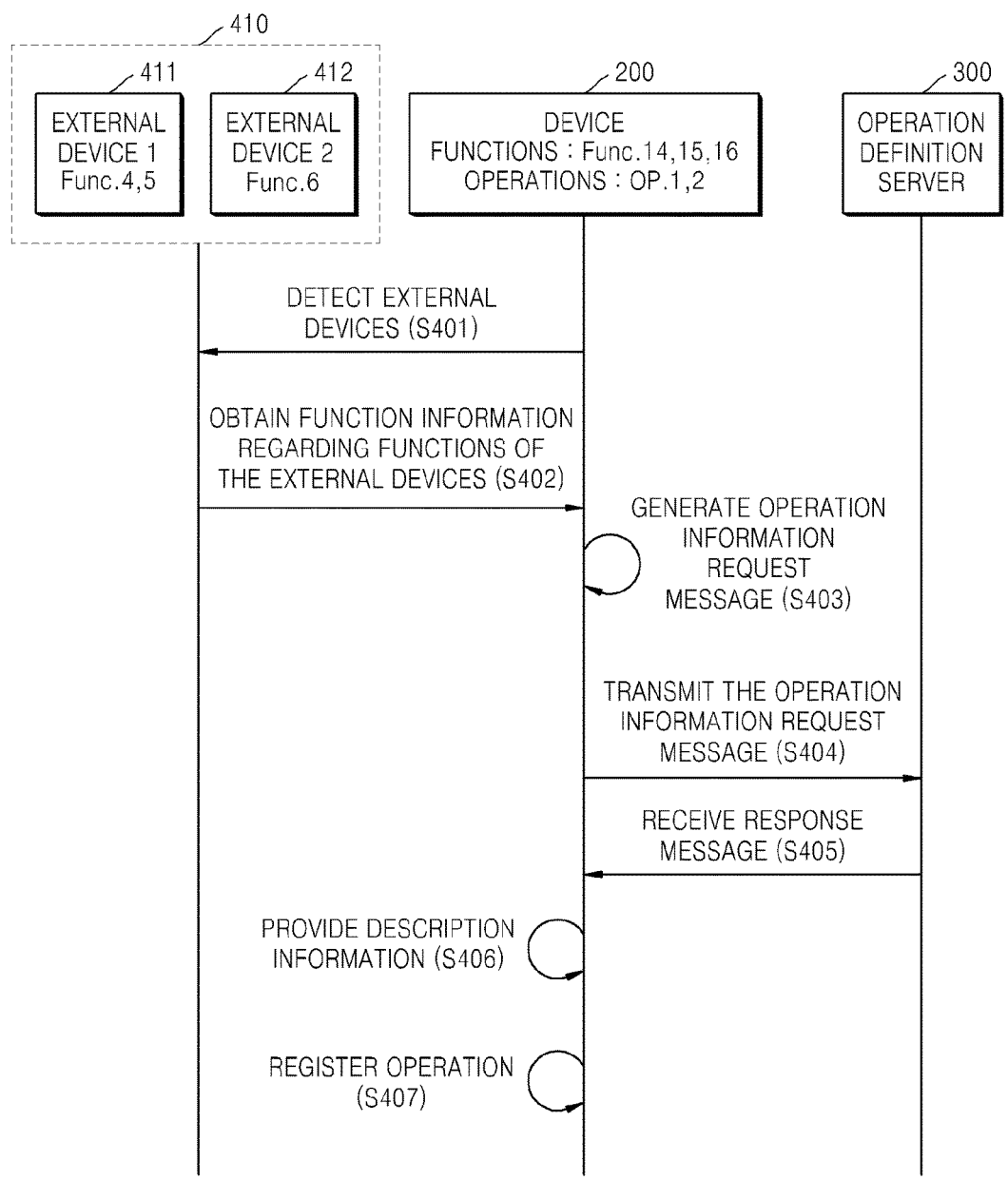
FIG. 4A is a flowchart illustrating an operation registering method, performed by a device, according to an embodiment of the present invention.

FIG. 4A is a flowchart illustrating an operation registering method, performed by the device 200, according to an embodiment of the present invention. Redundant descriptions between FIG. 4A and the device 200 of FIG. 2A are omitted here.

Referring to FIG. 4A, the device 200 and external devices 410, and operation definition server 300 are illustrated. In this regard, the external devices 410 are devices according to an embodiment of the present invention and may have different functions from the device 200. That is, device 200 may have functions 'Func.14', 'Func.15', 'Func.16', an external device 411 may have functions 'Func.4', 'Func.5', and another external device 412 may have a function 'Func.6'. Also, operations 'OP.1', 'OP.2' may be registered by a manufacturer of the device 200 and stored in the device 200. In this regard, operation 'OP.1' may sequentially perform the functions 'Func.14→Func.15→Func.16', and operation 'OP.2' may sequentially perform the functions 'Func.16→Func.14'. The operation registering method performed by the device 200 will now be described below.

The device 200 detects the external devices 410 present on a network (S401).

If the external devices 410 are detected, the device 200 obtains function information regarding functions of the external devices 410 (S402). That is, the device 200 obtains function information regarding the functions 'Func.4', 'Func.5', 'Func.6' of the external devices 410. The device 200 stores the obtained function information regarding the functions therein.

The device 200 generates an operation information request message based on a result of the detection by the external devices 410 (S403). For example, the operation information request message may include a list of the functions of the external devices 410 and the device 200. Thus, the operation information request message includes a list of the functions 'Func.14', 'Func.15', 'Func.16' of the device 200, the functions 'Func.4', 'Func.5' of the external device 411, and the function 'Func.6' of the external device 412.

The device 200 transmits the generated operation information request message to the operation definition server 300 (S404).

The device 200 receives a response message to the operation information request message from the operation definition server 300 (S405). In this regard, the response message may include operation information regarding new operations 'OP.3', 'OP.4'. The operation 'OP.3' includes the functions 'Func.4→Func.15→Func.16'. The operation 'OP.4' includes the functions 'Func.6→Func.14→Func.5'. The response message may include description information regarding the operations 'OP.3', 'OP.4'.

The device 200 provides a user with the description information included in the response message through a user interface (S406).

The device 200 registers an operation selected by the user therein (S407). In this regard, the user may opt to select the operation 'OP.3' only. The device 200 may store operation information regarding the operation 'OP.3' in the device 200 and may discard operation information regarding operation 'OP.4'. However, the user may opt to select 'OP.4' only, or both 'OP.3' and 'OP.4', depending on the user's preferences. Alternatively, the device 200 may automatically select 'OP.3' only, 'OP.4' only, or both 'OP.3' and 'OP.4', depending on a predetermined setting or default setting, without user input. For example, the device 200 may automatically register one or more operations received from the operation definition server 300 in response to the operation information request message.

Figure 4B:
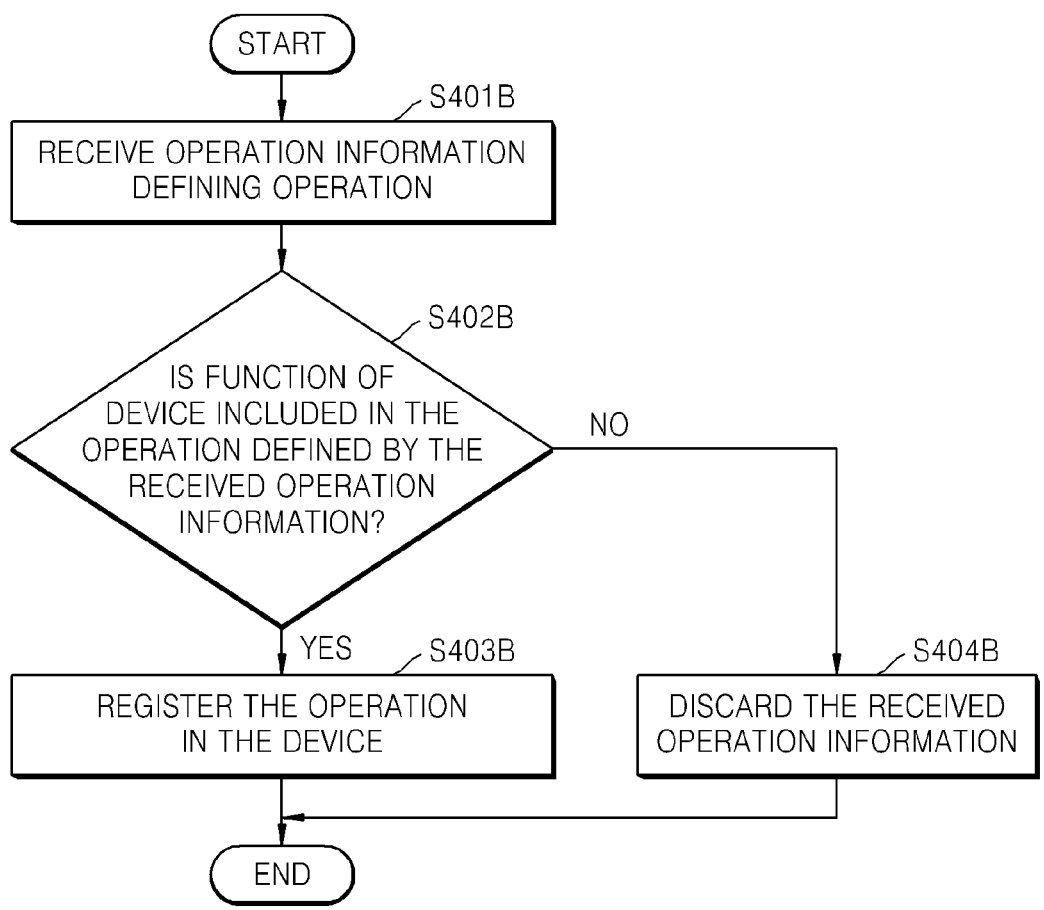
FIG. 4B is a flowchart illustrating an operation registering method, performed by a device, according to another embodiment of the present invention.

FIG. 4B is a flowchart illustrating an operation registering method, performed by the device 200B, according to another embodiment of the present invention. Redundant descriptions between FIG. 4B and the device 200B of FIG. 2B are omitted here. Also, other redundant descriptions between FIGS. 4B and 4A are omitted here.

The device 200B receives operation information defining an operation performed based on a combination of at least one function of the device 200B and at least one function of at least one external device (S401B).

The device 200B determines whether the operation defined by the operation information includes any function of the device 200B (S402B).

If the device 200B determines that the operation defined by the operation information includes any function of the device 200B, the device 200B registers the operation defined by the operation information therein (S403B).

If the device 200B determines that the operation defined by the operation information does not include any function of the device 200B, the device 200B discards the operation information (5404B).

Figure 5A:
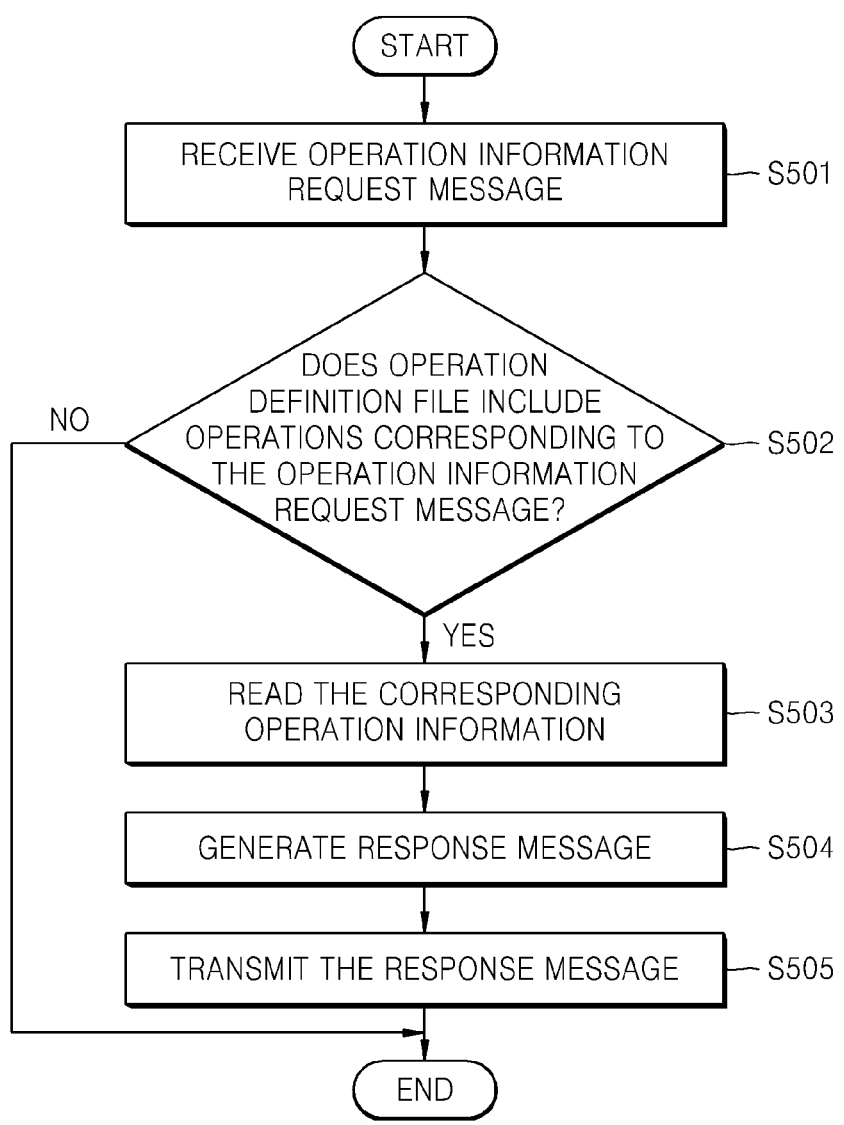
FIG. 5A is a flowchart illustrating a method of providing operation information, according to an embodiment of the present invention.

FIG. 5A is a flowchart illustrating a method of providing operation information, according to an embodiment of the present invention. Redundant descriptions between FIG. 5A and the operation definition server 300 of FIG. 3A are omitted here. In addition, an example of the functions of the device 200 and the external devices 410 will be provided.

Referring to FIG. 5A, the operation definition server 300 receives an operation information request message from the device 200 (S501).

The operation definition server 300 determines whether an operation definition file includes operations corresponding to the operation information request message (S502). That is, the operations 'OP.3', 'OP.4' of the operation definition file may be determined as operations corresponding to the operation information request message.

A process of determining whether the operation definition file includes the operations corresponding to the operation information request message is described with reference to FIG. 9. For example, the operation information request message may include 'Func.14-16' and 'Func.4-6' as a list of the functions of the device 200 and the external devices 410.

The operation definition file may include information regarding operations 'OP.3-7'. The operation 'OP.3' includes functions 'Func.4,15,16'. The functions 'Func.4, 15,16' are included in the list of the functions of the operation information request message. Thus, the operation definition server 300 determines that the operation 'OP.3' of the operation definition file corresponds to the operation information request message. Likewise, the operation definition server 300 determines that the operation 'OP.4' of the operation definition file also corresponds to the operation information request message. Meanwhile, the operation 'OP.5' includes functions 'Func.15,17,1'. The operation information request message does not include the functions 'Func.17', 'Func.1'. Thus, the operation definition server 300 determines that the operation 'OP.5' of the operation definition file does not correspond to the operation information request message. Likewise, the operation definition server 300 determines that the operations 'OP.6-7' of the operation definition file do not correspond to the operation information request message. Thus, in one embodiment it is determined that an operation included in the operation definition file corresponds to an operation information request message when the operation in the operation definition file includes only functions which are included in the operation information request message. If an operation in the operation definition file includes only some or no functions which are included in the operation information request message, the operation is determined to not correspond to the operation information request message.

If the operation definition file includes corresponding operation information, the operation definition server 300 reads the corresponding operation information from the operation definition file (S503). In the example above, the operation definition server 300 retrieves operation information regarding the operations 'OP.3', 'OP.4' from the operation definition file. The retrieved operation information may include description information regarding the operations 'OP.3', 'OP.4'.

The operation definition server 300 generates a response message including the retrieved operation information (S504).

The operation definition server 300 transmits the response message to the device 200 (S505).

Figure 5B:
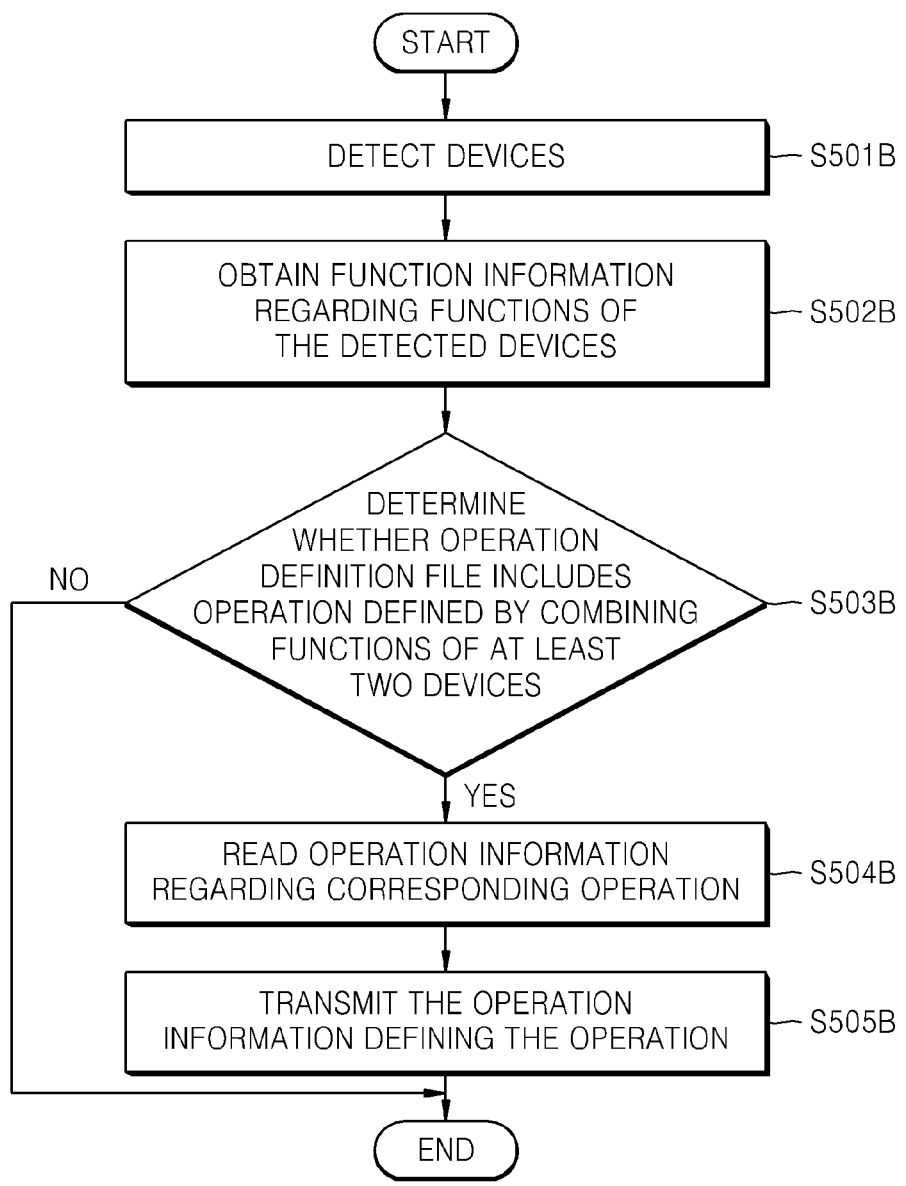
FIG. 5B is a flowchart illustrating a method of providing operation information, according to another embodiment of the present invention.

FIG. 5B is a flowchart illustrating a method of providing operation information, according to another embodiment of the present invention. Redundant descriptions between FIG. 5B and the operation definition server 300B of FIG. 3B are omitted here.

Referring to FIG. 5B, the operation definition server 300B detects devices present on a network (S501B). The operation definition server 300B detects the device 200B and the external devices 410.

The operation definition server 300B obtains function information regarding functions of the detected devices (S502B). The operation definition server 300B obtains function information regarding the functions of the device 200B and the external devices 410. If the device 200B is newly installed in a given network, the operation definition server 300B may obtain function information regarding the functions of the newly installed device 200B.

The operation definition server 300B determines whether an operation definition file includes an operation defined by combining functions of at least two devices (S503B).

The operation definition server 300B retrieves operation information corresponding to the operation defined by the combination of functions of at least two devices from the operation definition file according to a result of the determination (S504B).

The operation definition server 300B transmits the operation information to a predetermined device (S505B). In this regard, the predetermined device may include all of the devices present on the network or may be specified as a device capable of performing the operation defined by the operation information. Thus, in one embodiment a device may automatically receive operation information from the operation definition server without first querying the server (e.g., by transmitting an operation information request message to the operation definition server).

Figure 6:
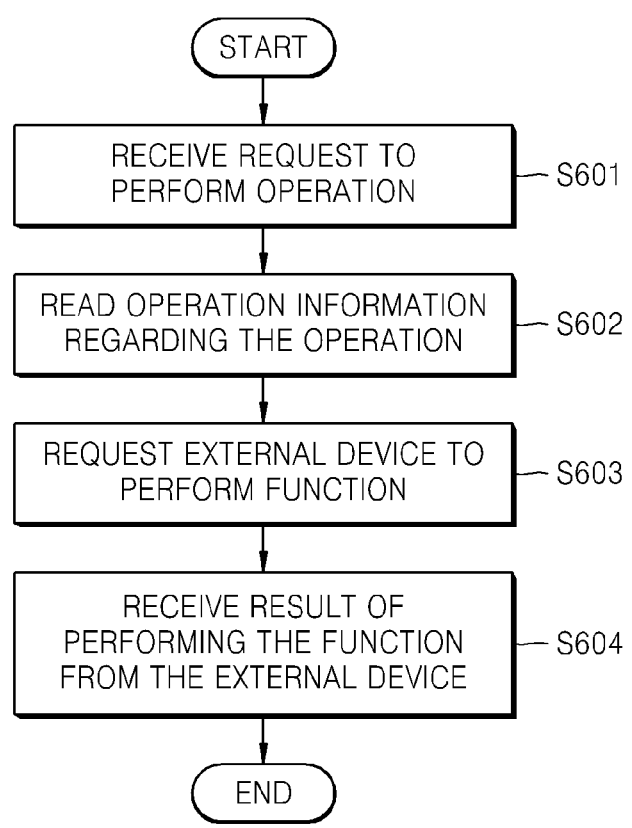
FIG. 6 is a flowchart illustrating a method of performing a registered operation, performed by a device, according to an embodiment of the present invention.

FIG. 6 is a flowchart illustrating a method of performing a registered operation, performed by a device, according to an embodiment of the present invention. Redundant descriptions between FIG. 6 and FIGS. 1 through 5B are omitted here. The device for performing the registered operation in FIG. 6 may be the device 200 of FIG. 2A, or the device 200B of FIG. 2B. For convenience of description, the device will be described as the device 200 below.

Referring to the above example, device 200 may receive a request from a user to perform the operation 'OP.3' (S601). That is, the user selects the operation 'OP.3' from among the operations registered in the device 200.

The device 200 reads operation information regarding the operation 'OP.3' from the operation information storage unit 242 (S602). The device 200 determines that the function 'Func.4' included in the operation 'OP.3' is a function of the external device 411.

The device 200 requests the external device 411 to perform the function 'Func.4' (S603). In this regard, the device 200 may obtain a right to perform the function 'Func.4' by authenticating the external device 411.

The device 200 receives a result of the performing of the function 'Func.4' from the external device 411 (S604). The device 200 performs the other functions 'Func.15', 'Func.16' based on the result of the performing of the function 'Func.4' received from the external device 411. Accordingly, the device 200 completely ends performing the operation 'OP.3'.

Figure 7:
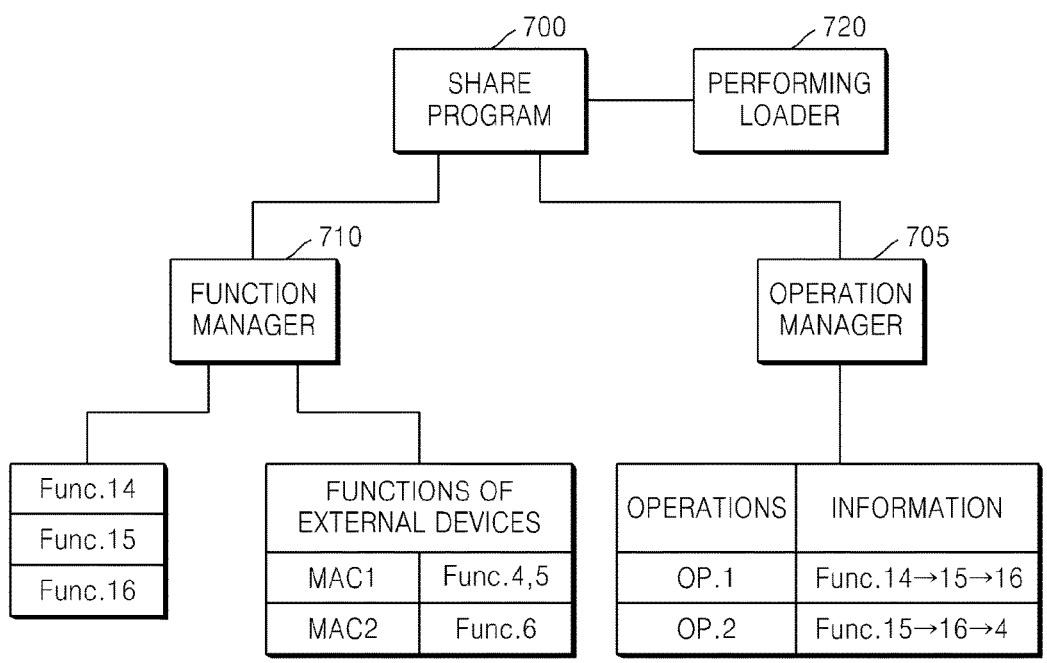
FIG. 7 is a diagram of a structure of software installed in a device, according to an embodiment of the present invention.

FIG. 7 is a diagram of a structure of software installed in a device, according to an embodiment of the present invention.

Referring to FIG. 7, a share program 700 includes an operation manager 705, a function manager 710, and a performing loader 720.

The share program 700 may be implemented as a daemon that runs as a background process in the device 200.

The function manager 710 manages functions stored in the function information storage unit 241, and obtains function information regarding functions of external devices present on a network. If the function manager 710 obtains the function information regarding functions of external devices, the function manager 710 stores the function information regarding functions in the function information storage unit 241. The function manager 710 may store the function information regarding functions of external devices by linking the information with device identifiers.

The share program 700 may read function information stored in the function information storage unit 241 by using the function manager 710.

The operation manager 705 manages operation information stored in the operation information storage unit 242. The operation manager 705 may generate an operation information request message based on the functions of the external devices present on the network. If the operation manager 705 receives operation information defining an operation performed based on a combination of the functions of the device 200 and external devices from the operation definition server 300, the operation manger 705 registers an operation selected by the user in the device 200. That is, the operation manager 705 stores operation information regarding the operation selected by the user in the operation information storage unit 242. The operation manager 705 may also store description information regarding the operation in the operation information storage unit 242.

The performing loader 720 performs an operation requested by the user. The performing loader 720 reads operation information regarding the operation requested by the user from the operation information storage unit 242 by using the operation manager 705. The performing loader 720 performs the operation in connection with external devices in a case where the operation requested by the user includes functions of external devices.

Although FIG. 7 is described above based in part on the former embodiment of FIG. 1, one of ordinary skill in the art can easily change a design to implement a program of the latter embodiment from the description of the former embodiment, and thus a description of the program of the latter embodiment will be omitted here.

Figure 8:
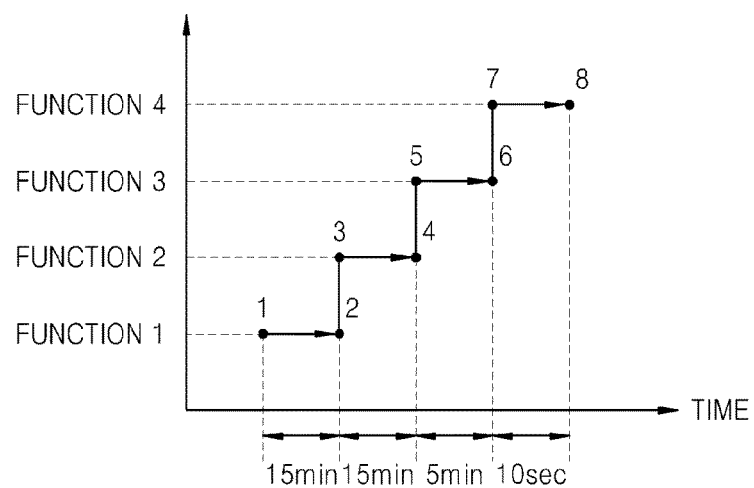
FIG. 8 is a schematic graph for describing a process of performing an operation performed by a device, according to an embodiment of the present invention.

FIG. 8 is a schematic graph for describing a process of performing an operation performed by a device, according to an example embodiment of the present invention.

A process of a washing machine to perform a "washing" operation and output an image and notification sound informing that the washing operation is completely finished in connection with a TV set as a last step of the "washing" operation will be described with reference to FIG. 8.

Operation information regarding the "washing" operation defines performing of a series of functions of 'Func.1→Func.2→Func.3→Func.4'. In this regard, it is assumed that the functions Func.1, Func.2, Func.3, Func.4, respectively, refer to functions of performing cleaning, rinsing, spin-dry, and outputting the image and notification sound.

The operation information regarding the "washing" operation decides a time for which each function is performed. For example, the operation information regarding the "washing" operation may decide 15 minutes for each of the functions Func.1, Func.2, 5 minutes for the function Func.3, and 10 seconds for the function Func.4' as times for which the functions Func.1, Func.2, Func.3, Func.4 are performed.

In this regard, the information regarding the "washing" operation may use a sequence number to decide a sequence of the functions Func.1, Func.2, Func.3, Func.4 to be performed. For example, each of the functions Func.1, Func.2, Func.3, Func.4 may start with an odd sequence number., and each of the functions Func.1, Func.2, Func.3, Func.4 may end with an even sequence number, after each of the functions Func.1, Func.2, Func.3, Func.4 is performed. If one of the functions Func.1, Func.2, Func.3, Func.4 is completely performed, a performing loader of software of the washing machine may perform a next function by increasing a sequence counter.

The performing loader performs the function Func.1 having number 1 as an initial sequence number for 15 minutes. If the function Func.1 is completely performed, the performing loader increases the sequence counter by 1. Then the performing loader performs the function Func.2 for 15 minutes. If the function Func.2 is completely performed, the performing loader increases the sequence counter by 1. Then the performing loader performs the function Func.3 for 5 minutes. If the function Func.3 is completely performed, the performing loader increases the sequence counter by 1. Then the performing loader requests the TV set to perform the function Func.4 for 10 seconds. That is, the performing loader transmits input data of an image message and a notification sound to the TV set. The TV set outputs an image and notification sound indicating that "the washing operation is complete" on a screen of the TV set. If the function Func.4 is completely performed, the performing loader increases the sequence counter by 1. Then the washing machine receives a message indicating the image and notification sound are completely output as output data from the TV set. The performing loader increases the sequence counter by 1, determines that no function is to be performed, and ends performing the "washing operation".

Although a user may not have enough prior knowledge to register an operation in a device which is performed by sharing functions of at least two devices, according to the above-described embodiments, the user may register the operation to be optimized for an environment in which the device is installed. Also, the device may organically share functions with other devices present on a network based on the registered operation. In addition, the user of the device may be satisfied by adding new operations to the device, where the operations may be added automatically or according to the user's preferences.

The disclosure herein has provided example embodiments of a device which may share functions with one or more external devices to perform an operation, by communicating with an operation definition server, however the disclosure is not limited to specific embodiments. For example, in one embodiment the operation definition server itself may act as external device and an operation definition server, and may share functions with the device. The device may obtain function information from the operation definition server and obtain operation information from the operation definition server based on the function information obtained from the operation definition server acting as an external device, and based on function information obtained from any other external devices.

The method and apparatus for sharing a function with an external device and performing an operation to the above-described example embodiments may use one or more processors, which may include a microprocessor, central processing unit (CPU), digital signal processor (DSP), or application-specific integrated circuit (ASIC), as well as portions or combinations of these and other processing devices. For example, the devices, external devices, and operation definition server disclosed herein may include one or more processors, and the methods disclosed herein which are performed by the devices, external devices, and operation definition server, may be executed using one or more processors.

The terms "module", and "unit," as used herein, may refer to, but is not limited to, a software or hardware component, circuit, or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The method for sharing a function and performing an operation in a device on a network, or the method for providing operation information, as disclosed herein, may be embodied as computer readable code recorded in a non-transitory computer readable medium, including program instructions to implement various operations embodied by a computer. The media may also include, alone or in combination with the program instructions, data files, data structures, and the like. Here, the non-transitory computer readable medium may be any recording apparatus capable of storing data that is read by a computer system, e.g., a read-only memory (ROM), a random access memory (RAM), a hard disk, a compact disc (CD)-ROM, a digital versatile disc (DVD), a magnetic tape, a floppy disk, an optical data storage device, flash memory, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. The computer readable medium can be distributed among computer systems that are interconnected through a network, and the present invention may be stored and implemented as computer readable code in the distributed system.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method comprising:
by a first device connected to a server on at least one network:
detecting a second device on the at least one network;
in response to the detecting the second device, obtaining second device information regarding at least one second device function of the second device;
obtaining, from the server, operation information indicating at least one operation performable by executing a sequence of functions corresponding to a combination of:
at least one first device function of the first device, and
the at least one second device function of the second device based on the obtained second device information;
registering the at least one operation indicated by the obtained operation information, for performing the registered at least one operation by executing the sequence of the functions corresponding to the combination of the at least one first device function of the first device and the at least one second device function of the second device based on the obtained second device information,
wherein a function in the combination of the at least one first device function of the first device and the at least one second device function of the second device based on the obtained second device information has a defined function class, and the defined function class is a classification system that groups replaceable functions.

2. The method of claim 1, wherein:
the obtaining the operation information comprises determining whether the at least one operation indicated by the operation information includes any function of the functions corresponding to:
the at least one first device function of the first device, and
the at least one second device function of the second device,
wherein the registering the at least one operation comprises registering the at least one operation indicated by the obtained operation information in response to the determining that the at least one operation indicated by the operation information includes the any function of the functions.

3. The method of claim 1, wherein:
the obtaining the operation information comprises requesting the operation information from the server for the obtaining the operation information from the server.

4. The method of claim 3, wherein the obtaining the operation information further comprises transmitting, to the server, the at least one first device function of the first device and the at least one second device function of the second device based on the obtained second device information, for the obtaining the operation information from the server.

5. The method of claim 1, wherein the operation information comprises description information to be provided to a user to describe at least one operation defined by the operation information.

6. The method of claim 5, wherein the registering the at least one operation indicated by the received operation information comprises:
providing the user with the description information; and
registering the at least one operation indicated by the operation information in the first device according to at least one selection by the user.

7. A non-transitory computer readable recording medium having recorded thereon a computer program for executing the method of claim 1.

8. The method of claim 1, further comprising:
displaying the at least one operation for a selection by a user; and in response to the selection by the user, executing the combination of the at least one first device function of the first device and the at least one second device function of the second device, to perform the at least one operation.

9. A method of providing operation information defining at least one operation performed by sharing functions between a plurality of devices on at least one network, the method comprising:
obtaining at least two devices information indicating at least one respective device function of each of the at least two devices;
determining, using a server, whether at least one operation is performable by executing a sequence of functions corresponding to a combination of the at least one respective device function of each of the at least two devices based on the obtained at least two devices information;
retrieving the operation information indicating the at least one operation from an operation definition file according to the determining that the at least one operation is performable by executing the sequence of the functions corresponding to the combination of the at least one respective device function of each of the at least two devices; and
transmitting the retrieved operation information to at least one among the at least two devices, to perform the at least one operation by executing the sequence of the functions,
wherein the operation definition file includes a plurality of operations, each of the plurality of operations being defined as being performable by executing sequences of functions corresponding to combinations of device functions of the plurality of devices,
wherein a function in the combination of the at least one respective device function of each of the at least two devices has a defined function class, and the defined function class is a classification system that groups replaceable functions.

10. The method of claim 9, further comprising:
receiving a list of the device functions of the plurality of devices from a first device from among the plurality of devices,
wherein:
the determining whether the at least one operation is performable by executing the sequence of the functions comprises determining whether the at least one operation performable by executing a first sequence of functions corresponding to a combination of at least one first device function of the first device and at least one second device function of a second device, from among the plurality of devices, is included in the operation definition file, and
the transmitting the retrieved operation information comprises transmitting the retrieved operation information to the first device.

11. The method of claim 9, further comprising:
detecting the at least two devices among the plurality of devices on the network,
wherein the obtaining the at least two devices information comprises requesting the at least two device information indicating the at least one respective device function of each of the at least two devices, in response to the detecting the at least two device.

12. A first device connectable to a server on at least one network to perform at least one operation by sharing first device functions of the first device with a second device on the at least one network, the first device comprising:
a detector to detect the second device on the at least one network;
a network interface to:
obtain, in response to the detecting the second device, second device information regarding at least one second device function of the second device, and
obtain, from the server, operation information indicating at least one operation performable by executing a sequence of functions corresponding to a combination of:
at least one first device function of the first device, and
the at least one second device function of the second device based on the obtained second device information;
an operation register to register the at least one operation indicated by the obtained operation information, for performing the registered at least one operation, by executing the sequence of the functions corresponding to the combination of the at least one first device function of the first device and the at least one second device function of the second device based on the obtained second device information,
wherein a function in the combination of the at least one first device function of the first device and the at least one second device function of the second device based on the obtained second device information has a defined function class, and the defined function class is a classification system that groups replaceable functions.

13. The first device of claim 12, further comprising:
a determiner to determine whether the at least one operation indicated by the operation information includes any function of the functions corresponding to:
the at least one first device function of the first device, and
the at least one second device function of the second device,
wherein, in response to the determiner determining that the at least one operation indicated by the operation information includes the any function of the functions, the operation register registers the at least one operation indicated by the obtained operation information.

14. The first device of claim 12, further comprising an operation information requester to request the operation information from the server, for the network interface to obtain the operation information from the server.

15. The first device of claim 14, wherein the operation information requester is further to transmit, to the server, the at least one first device function of the first device and the at least one second device function of the second device based on the obtained second device information, for the network interface to obtain the operation information.

16. The first device of claim 12, wherein the operation information comprises description information to be provided to a user to describe at least one operation defined by the operation.

17. The first device of claim 16, further comprising:
a user interface to provide the user with the description information,
wherein the operation register registers the at least one operation indicated by the operation information in the first device according to at least one selection by the user.

18. A server to provide operation information indicating at least one operation performable by a plurality of devices by sharing functions among the plurality of devices on at least one network, the server comprising:
- a storage to store the operation information indicating at least one operation;
- a network interface to obtain function information indicating device functions of devices among the plurality of devices on the at least one network;
- a determiner to determine whether the at least one operation is performable by executing a sequence of functions corresponding to a combination of the device functions of the devices among the plurality of devices based on the obtained function information; and
- a retriever to retrieve the operation information indicating the at least one operation from an operation definition file in response to the determiner determining that the at least one operation is performable by executing the sequence of the functions corresponding to the combination of the device functions of the devices, wherein:
- the network interface is further to transmit the retrieved operation information to at least one device among the plurality of devices to perform the at least one operation by executing the sequence of the functions, and
- the operation definition file is includes a plurality of operations, each of the plurality of operations being defined as being performable by executing sequences of functions corresponding to combinations of the device functions of the plurality of devices,
- wherein a function in the combination of the device functions of the devices has a defined function class, and the defined function class is a classification system that groups replaceable functions.

19. The server of claim 18, wherein:
the network interface is further to receive a list of the device functions of the plurality of devices from a first device from among the plurality of devices,
the determiner determines whether the at least one operation is performable by executing the sequence of the functions by determining whether the at least one operation performable by executing a first sequence of functions corresponding to a combination of at least one first device function of the first device and at least one function of a second device from among the plurality of devices is included in the operation definition file.

20. The server of claim 18, further comprising:
a device detector to detect the plurality of devices on the at least one network; and
a function information obtainer to request the function information indicating the device functions of the devices among the plurality of devices, for the network device to obtain the function information regarding the device functions.

21. The server of claim 18, wherein
the storage is further to store the operation definition file.

* * * * *